(12) United States Patent
Wang et al.

(10) Patent No.: US 12,287,230 B2
(45) Date of Patent: Apr. 29, 2025

(54) CORIOLIS FLOWMETER WITH MULTIPLE FLOW TUBES

(71) Applicants: WALSN MEASUREMENT & CONTROL TECH (HEBEI) CO., LTD, Langfang (CN); WALSN LIMITED, Canterbury (GB)

(72) Inventors: Tao Wang, Langfang (CN); Chris Rolph, Langlang (CN); Baoyuan Shang, Langlang (CN)

(73) Assignees: WALSN MEASUREMENT AND CONTROL TECHNOLOGY (HEBEI) CO., LTD., Langfang (CN); WALSN LIMITED, Canterbury (GB)

( * ) Notice: Subject to any disclaimer, the term of this patent is extended or adjusted under 35 U.S.C. 154(b) by 0 days.

(21) Appl. No.: 18/723,080

(22) PCT Filed: Mar. 13, 2023

(86) PCT No.: PCT/CN2023/080963
§ 371 (c)(1),
(2) Date: Jun. 21, 2024

(87) PCT Pub. No.: WO2024/119647
PCT Pub. Date: Jun. 13, 2024

(65) Prior Publication Data
US 2025/0060236 A1 Feb. 20, 2025

(30) Foreign Application Priority Data
Dec. 6, 2022 (CN) .......................... 202211552633.4

(51) Int. Cl.
*G01F 1/84* (2006.01)
(52) U.S. Cl.
CPC .................. *G01F 1/8477* (2013.01)

(58) Field of Classification Search
CPC ............................. G01F 1/8472; G01F 1/8477
See application file for complete search history.

(56) References Cited

U.S. PATENT DOCUMENTS

| | | | |
|---|---|---|---|
| 2011/0167907 A1* | 7/2011 | Bitto ....................... | G01F 15/02 73/861.357 |
| 2017/0082474 A1 | 3/2017 | Schlosser | |

FOREIGN PATENT DOCUMENTS

| | | | |
|---|---|---|---|
| CN | 102753947 A | 10/2012 | |
| CN | 115560815 A | 1/2013 | |

(Continued)

OTHER PUBLICATIONS

International Search Report for PCT/CN2023/080963 issued by CNIPA (China National Intellectual Property Administration) on May 23, 2023.

(Continued)

*Primary Examiner* — Erika J. Villaluna
(74) *Attorney, Agent, or Firm* — AVEK IP, LLC

(57) ABSTRACT

In some embodiments, the disclosure provide a Coriolis flowmeter with multiple flow tubes, including a flow sensor and a flow transmitter is provided. The flow sensor includes a sensor housing, a sleeve, and two symmetrical flanges. A sensor assembly is arranged in the sensor housing, and the sensor assembly includes at least two flow tube groups, each flow tube group includes at least two flow tubes. Two flow tubes with the same size and geometry in different groups form a flow tube pair. At least two flow tube pairs are provided by at least two flow tube groups, each flow tube pair is fixedly connected together by at least one pair of node plates, a measurement area of the flow tubes is between an innermost pair of node plates, and each flow tube group is connected to a driver and a detector.

12 Claims, 17 Drawing Sheets

(56) References Cited

FOREIGN PATENT DOCUMENTS

| | | |
|---|---|---|
| CN | 103884395 A | 6/2014 |
| CN | 103900652 A | 7/2014 |
| CN | 104101394 A | 10/2014 |
| CN | 104406645 A | 3/2015 |
| CN | 204854846 U | 12/2015 |
| CN | 107209039 A | 9/2017 |
| CN | 206891504 U | 1/2018 |
| CN | 112857494 A | 5/2021 |
| CN | 113853510 A | 12/2021 |

OTHER PUBLICATIONS

Office Action for CN 202211552633.4 issued by CNIPA (China National Intellectual Property Administration) on Jan. 10, 2023.

* cited by examiner

CORIOLIS FLOWMETER WITH MULTIPLE FLOW TUBES

CROSS REFERENCE TO RELATED APPLICATIONS

This application is the United State national stage entry under 37 U.S.C. 371 of PCT/CN2023/080963, filed on Mar. 13, 2023, which claims priority to Chinese application number 202211552633.4, filed on Dec. 6, 2022, the disclosure of which are incorporated by reference herein in their entireties.

FIELD OF THE DISCLOSURE

The disclosure relates generally to the field of measurement instruments. More specifically, the disclosure relates to Coriolis flowmeters with multiple flow tubes.

BACKGROUND

Coriolis flowmeter is a mass flow measurement device based on Coriolis principle, which may also be used to measure the density of media. The core of an internal structure of the flow sensor is a flow tube, the number of which is usually one to two, and the measured medium flows through the flow tube. In the common twin-bent tube flow sensor, the flow tubes A and B are provided with a driving device, a detection device and a node plate. A measurement area is defined between the two node boards at inner sides, and the measurement area is in continuous tiny vibration by an electric signal applied by the driving device, and the detection device is used to detect the vibration. The two flow tubes are connected together at the ends by a flow divider, and then are connected to external assemblies.

Flow is a certain amount of fluid passing through the cross-sectional area per unit time, in a case that other conditions are fixed, the larger the cross-sectional area, the greater the flow, and the increase of the cross-sectional area is the increase of the diameter of the flow tube. The maintenance of the same measurement sensitivity will lead to an increase in length. In order to measure large flow, the large-caliber flow sensor larger than DN150 is generally large in size and heavy in weight, the requirements for the site are high, and the cost of the instrument itself is high. In a case that the pipe diameter is constant, the reduction of the size by simply reducing the length of a flow tube will lead to the reduction of the sensitivity of the sensor, so that the measurement performance is affected.

Under the working conditions of large flow such as ship loading and unloading trade, the requirement for flow is increasing, so it is necessary to design a sensor with larger flow. However, the problem that the overall size of the sensor cannot be too large needs to be solved, especially the problem that the mounting length or height of the sensor should not be too large.

In recent years, there has also been a four-bent tube design, the upper and lower flow tubes are connected and coupled together to vibrate, and the four tubes are connected together by node plates. However, for large-caliber flow tubes, the difference between the length of the measurement area of the upper flow tube pair and the length of the measurement area of the lower flow tube pair greater, which affects the coupling effect.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides a Coriolis flowmeter with multiple flow tubes including a flow sensor and a flow transmitter, there is no specific limitation on the connection mode of the flow sensor and the flow transmitter, which may employ an integrated fixed connection structure, or a split cable connection structure. The flow sensor includes a sensor housing, a sleeve, and two symmetrical flanges. A sensor assembly is arranged in the sensor housing, and the sensor assembly includes at least two flow tube groups, each flow tube group includes at least two fixedly connected flow tubes, thereby achieving the vibration coupling of the flow tubes in the same group in a measurement area. Two flow tubes with the same size and geometry in different groups form a flow tube pair, and the measurement areas of the flow tube pairs have equal or similar stiffness. At least two flow tube pairs are provided by at least two flow tube groups, and each flow tube pair is fixedly connected together by at least one pair of node plates. A measurement area of the flow tubes is located between the innermost pair of node plates, and at least one pair of node plates of the first flow tube pair and at least one pair of node plates of the second flow tube pair are independent structures. A driver and a detector are connected to each flow tube group. Each flow tube communicates with the external parts through flanges at both ends, measured media flow in the flow tube, and an electric signal applied by the driver makes the measurement area in continuous tiny vibration, and the detector is used to detect the vibration.

Optionally, all the flow tubes have a same outer diameter and thickness, and the measurement areas are equal or similar in total length, or all the flow tubes have the same outer diameter or inner diameter, and although the measurement areas are unequal in total length, the stiffness of the measurement areas is equal or similar through different flow tube thicknesses, or all the flow tubes have the same outer diameter and thickness, although the measurement areas are unequal in total length, the stiffness of the measurement areas is equal or similar by adding a reinforcing plate in the measurement area, or the stiffness of the measurement area is calculated more accurately using a finite element method, and the stiffness of two or more pairs of flow tubes is equal or similar by adjusting design parameters.

Optionally, the flow tube group includes a first flow tube group, and a second flow tube group. All flow tubes in the first flow tube group are connected by a first detector fixing plate, and all flow tubes in the second flow tube group are connected by a second detector fixing plate, and the detector is fixedly arranged between the first detector fixing plate and the second detector fixing plate. A driver fixing plate does not connect all flow tubes in each group together, while the detector fixing plate connects all flow tubes in each group together.

Optionally, the flow tube group includes a first flow tube group, and a second flow tube group. All flow tubes in the first flow tube group are connected by a first driver fixing plate, and all flow tubes in the second flow tube group are connected by a second driver fixing plate. The driver is fixedly arranged between the first driver fixing plate and the second driver fixing plate. The driver fixing plate connects all flow tubes in each group together, while the detector fixing plate does not connect all flow tubes in each group together. The present disclosure is not only limited to such arrangement structures, and a fixing structure that the driver fixing plate connects all flow tubes in each group together and the detector fixing plate also connects all flow tubes in each group together may also be employed.

Optionally, the driver fixing plate does not connect all flow tubes in each group together, and the detector fixing plate also does not connect all the flow tubes in each group together. The flow tubes in each flow tube group are fixedly connected by at least one pair of fixing plate groups, and each pair of fixing plate groups includes two fixing plates which have the same structure and are symmetrically placed along a middle plane between a flowmeter inlet and a flowmeter outlet.

Optionally, the driver includes a first driver and a second driver, the detector includes a first detector and a second detector, and the flow tube group includes a first flow tube group, a second flow tube group, a third flow tube group, and a fourth flow tube group. Each of the first flow tube group and the second flow tube group at least includes two flow tubes, and each of the third flow tube group and the fourth flow tube group at least includes one flow tube. All flow tubes in the first flow tube group are connected by the first driver fixing plate, and all flow tubes in the second flow tube group are connected by the second driver fixing plate. The first driver is fixedly arranged between the first driver fixing plate and the second driver fixing plate. The first detector is connected to the flow tubes in the first flow tube group and the second flow tube group. The second driver and the second detector are connected to the flow tubes in the third flow tube group and the fourth flow tube group, and the first driver and the second driver are different in operating frequency with a difference of at least 5 Hz.

Optionally, the driver includes a first driver and a second driver, the detector includes a first detector and a second detector, and the flow tube group includes a first flow tube group, a second flow tube group, a third flow tube group, and a fourth flow tube group. Each of the first flow tube group and the second flow tube group at least includes two flow tubes, and each of the third flow tube group and the fourth flow tube group at least includes one flow tube. All flow tubes in the first flow tube group are connected by the first detector fixing plate, and all flow tubes in the second flow tube group are connected by the second detector fixing plate. The first detector is fixedly arranged between the first detector fixing plate and the second detector fixing plate. The first driver is connected to the flow tubes in the first flow tube group and the second flow tube group. The second driver and the second detector are connected to the flow tubes in the third flow tube group and the fourth flow tube group. The first driver and the second driver are different in operating frequency with a difference of at least 5 Hz.

Optionally, the driver includes a first driver and a second driver, the detector includes a first detector and a second detector, and the flow tube group includes a first flow tube group, a second flow tube group, a third flow tube group, and a fourth flow tube group. Each of the first flow tube group and the second flow tube group at least includes two flow tubes, and each of the third flow tube group and the fourth flow tube group at least includes one flow tube. All flow tubes in the first flow tube group and the second flow tube group are fixedly connected by at least one pair of fixing plates, and each pair of fixing plates includes two fixing plates which have the same structure and are symmetrically arranged along a middle plane between the flowmeter inlet and the flowmeter outlet, The first detector and the first driver are connected to the flow tubes in the first flow tube group and the second flow tube group, the second driver and the second detector are connected to the flow tubes in the third flow tube group and the fourth flow tube group. The first driver and the second driver are different in operating frequency with a difference of at least 5 Hz.

Optionally, the node plate includes first node plates and second node plates. The measurement area of the flow tubes is between two first node plates, the two second node plates are separately provided at outer sides of the two first node plates, and the second node plates are located in a connecting area of the flow tube. Each flow tube pair is individually connected by a pair of first node plates and a pair of second node plates.

Optionally, the node plate includes first node plates, second node plates and third node plates. The measurement area of the flow tubes is between the two first node plates, the two second node plates are separately provided at outer sides of the two first node plates, and each second node plate is located at a connecting area of the flow tube. Each flow tube pair is individually connected by a pair of first node plates and a pair of second node plates. Two third node plates are symmetrically provided at the outer sides of the two second node plates, and the third node plates are used to connect two or more flow tube pairs together.

Optionally, each flow tube is of a symmetric V-shaped or a trapezoidal structure. The V-shaped structure has seven segments arranged symmetrically from an inlet end to an outlet end, which are respectively a straight segment, a circular arc segment, a straight segment, a circular arc segment, a straight segment, a circular arc segment and a straight segment. The trapezoidal structure has nine segments arranged symmetrically from the inlet end to the outlet end, which are a straight segment, a circular arc segment, a straight segment, a circular arc segment, a straight segment, a circular arc segment, a straight segment, a circular arc segment and a straight segment.

BRIEF DESCRIPTION OF THE DRAWINGS

Illustrative embodiments of the disclosure are described in detail below with reference to the attached drawing figures.

DETAILED DESCRIPTION

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

In FIGS. 1-17: 1 represents first flow tube, 2 represents second flow tube, 3 represents third flow tube, 4 represents fourth flow tube, 5 represents first node plate, 6 represents second node plate, 7 represents third node plate, 8 represents first driver fixing plate, 9 represents second driver fixing plate, 10 represents first detector fixing plate, 11 represents second detector fixing plate, 12 represents driver, 1201 represents first driver, 1202 represents second driver, 13 represents detector, 1301 represents first detector, 1302 represents second detector, 14 represents fifth flow tube, 15 represents sixth flow tube, 16 represents reinforcing plate, 17 represents flow sensor, 18 represents flow transmitter, 19 represents sensor housing, 20 represents sleeve, 21 represents flange, 22 represents first fixing plate, and 23 represents second fixing plate.

Figure 8:
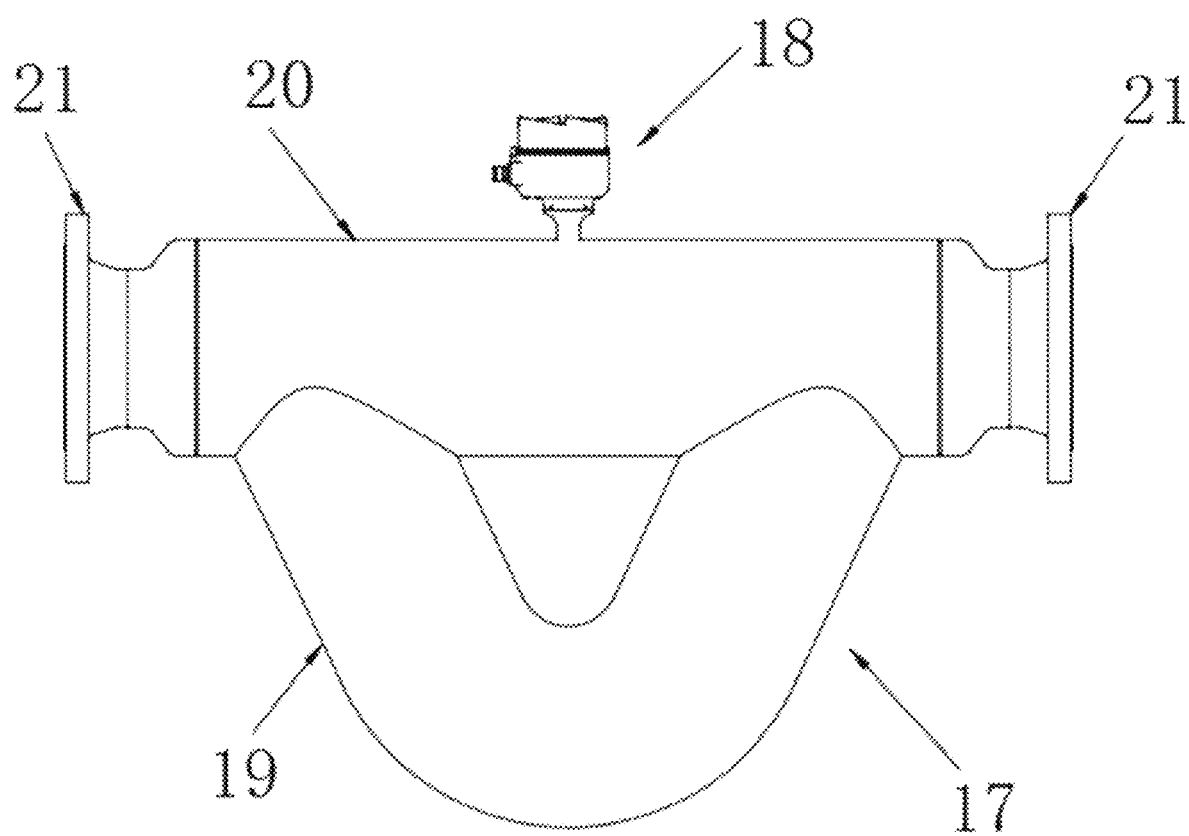
FIG. 8 shows a structural schematic diagram of a Coriolis flowmeter with multiple flow tubes according to Embodiment 5 of the present disclosure.
Figure 9:
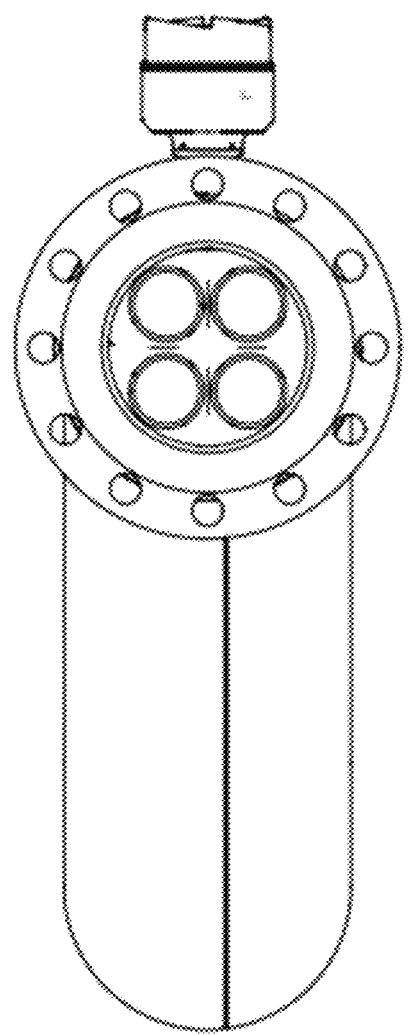
FIG. 9 shows a side view of FIG. 8.

A Coriolis flowmeter with multiple flow tubes, as shown in FIG. 8 and FIG. 9, may include a flow sensor 17 and a flow transmitter 18. The flow sensor 17 may include a sensor housing 19, a sleeve 20, and two symmetrical flanges 21. A sensor assembly is arranged in the sensor housing 19, the sensor assembly may include at least two flow tube groups, and each flow tube group may include at least two fixedly connected flow tubes, thereby achieving the vibration coupling of the flow tubes in the same group in a measurement area. Two flow tubes with the same size and geometry in different groups form a flow tube pair. Stiffness of the measurement areas of the flow tube pairs is equal or similar, at least two flow tube pairs are provided by at least two flow tube groups, each flow tube pair is fixedly connected together by at least one pair of node plates, the measurement area of the flow tubes is located between the innermost pair of node plates, and at least one pair of node plates of the first flow tube pair and at least one pair of node plates of the second flow tube pair are independent structures. A driver 12 and a detector 13 are connected to each flow tube group. Each flow tube communicates with the external parts through the flanges 21 at both ends, a measured medium flows in the flow tube, and an electric signal applied by the driver 12 makes the measurement area in continuous tiny vibration, and the detector 13 is used to detect the vibration.

Embodiment 1

Figure 1:
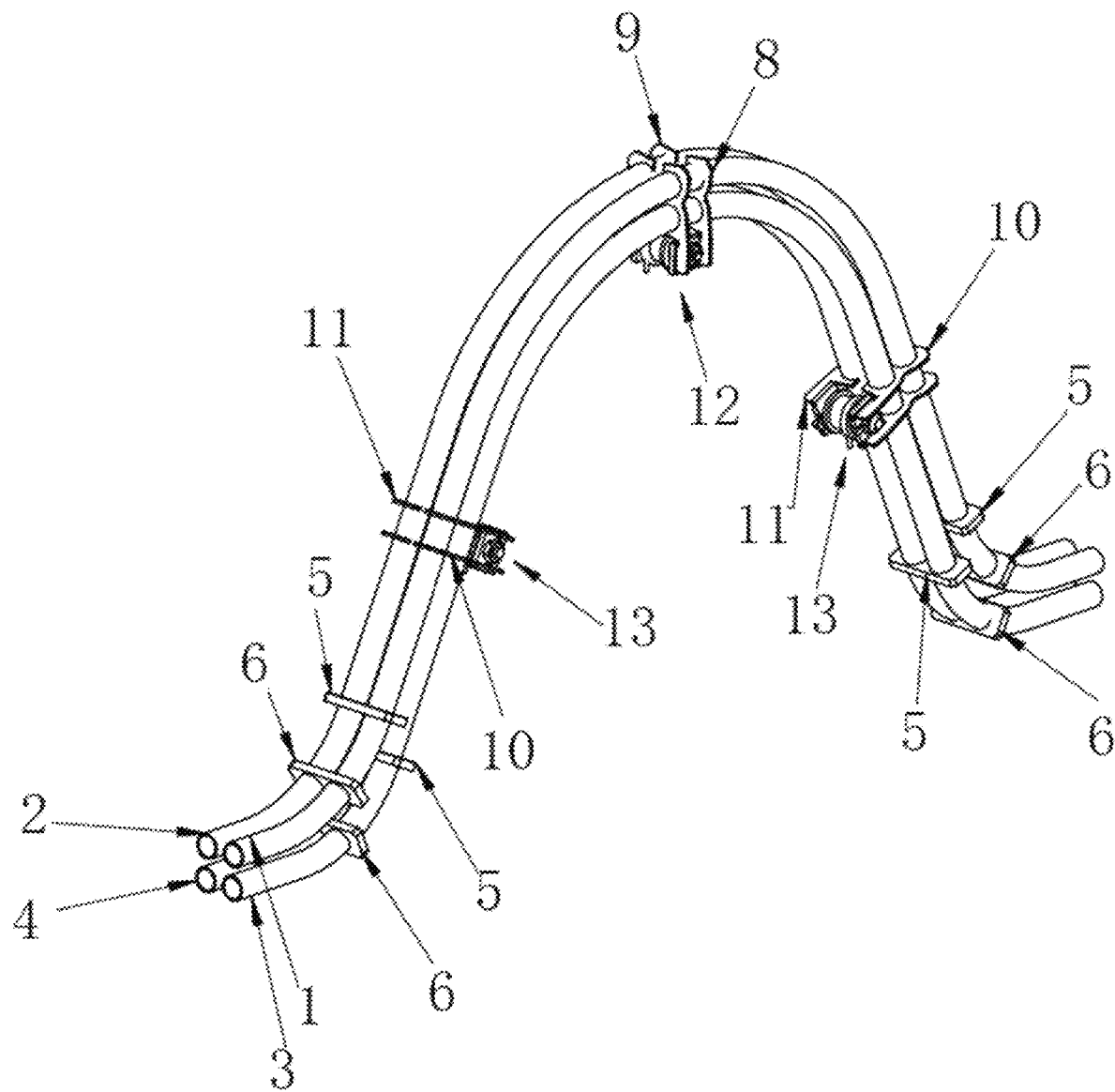
FIG. 1 shows a schematic diagram of a flow tube group according to Embodiment 1 of the present disclosure.
Figure 2:
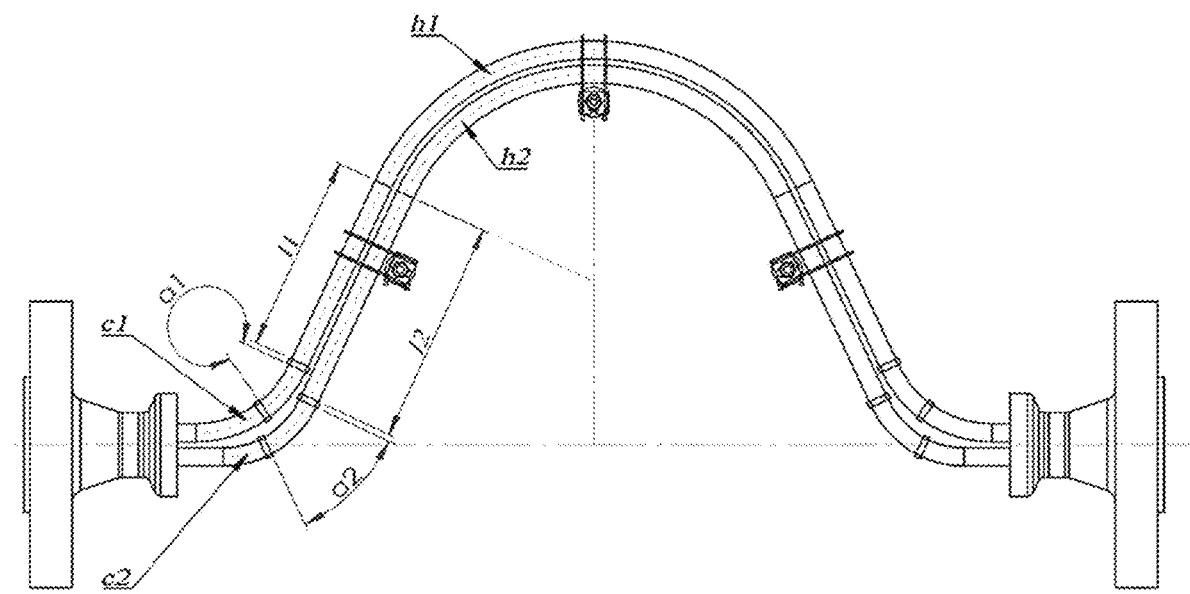
FIG. 2 shows a schematic diagram of the dimension of a flow tube group according to Embodiment 1 of the present disclosure.

An arrangement form of the flow tubes in this embodiment may be improved, as shown in FIG. 1 and FIG. 2, a first flow tube 1, a second flow tube 2, a third flow tube 3 and a fourth flow tube 4 are all bent tubes, which are symmetrical in left and right, and are approximately V-shaped. The first flow tube 1 and the second flow tube 2 are both composed of multiple circular arc segments and multiple straight segments, have the same diameter, wall thickness and trajectory, are made of the same material, and are connected together by two first node plates 5 and two second node plates 6, so as to form a first flow tube pair. A measurement area of the pair of flow tubes is defined between the two first node plates 5, and an area outside this measurement area, which may include two second node plates 6, is a connecting area. The third flow tube 3 and the fourth flow tube 4 are both composed of multiple circular arc segments and multiple straight segments, have the same diameter, wall thickness and trajectory, are made of the same material, and are connected together by two first node plates 5 and two second node plates 6, so as to form a second flow tube pair. A measurement area of the pair of flows tubes is defined between the two first node plates 5, and an area outside this measurement area, which may include two second node plates 6, is a connecting area.

The third flow tube 3 and the fourth flow tube 4 are located in an area enclosed by the first flow tube 1 and the second flow tube 2. In the flow tube, straight tube segments 11 and 12 are parallel, and the circular arc segments h1 and h2 are concentric, $11+h1=12+h2$. The circular arc segments c1 and c2 of the flow tube do not need to be concentric. The first flow tube 1 and the third flow tube 3 are connected by a first driver fixing plate 8 and two first detector fixing plates 10 to form a first flow tube group. The second flow tube 2 and the fourth flow tube 4 are connected by a second driver fixing plate 9 and two second detector fixing plates 11 to form a second flow tube group. The detector 13 is arranged on the detector fixing plate, the driver 12 is arranged on the driver fixing plate, and spacing between two flow tube groups is the same along the whole bending trajectory of the flow tube groups. The flow tube groups are fixedly connected to form a coupled structure, thus coupling the vibration of the upper flow tube and the lower flow tube together. However, the node plates of the upper pair of flow tubes and the lower pair of flow tubes are independent and do not connect the upper bent tube and the lower bent tube together.

In this embodiment, the first pair of flow tubes and the second pair of flow tubes have equal or similar stiffness in the measurement area. The measurement area is symmetric in left and right, and the length of half the measurement area is composed of the straight tube segment (linear length 11 or 12) and a bent tube segment (circular arc length h1 or circular arc length h2), 11 and 12 are parallel, and h1 and h2 are concentric. The length of the measurement area of the first pair of flow tubes is equal to $2(11+h1)$, and the length of the measurement area of the second pair of flow tubes is equal to $2(12+h2)$. In order to obtain similar or same stiffness, $11+h1=12+h2$ is adopted, so the stiffness of the upper pair of tubes and lower pair of tubes is similar, and the measurement sensitivity of the upper pair of tubes and lower pair of tubes is also similar, which may improve the coupling between the upper measurement area and the lower measurement area. For the flow tube with small aspect ratio, the optimal method is to calculate the stiffness of the measurement area of each pair of flow tubes more accurately using a finite element method, thus making the stiffness of the measurement areas of the flow tube pairs equal or similar.

The first pair of flow tubes and the second pair of flow tubes each have independent node plates, and due to the independent node plates, an included angle a1 between the upper node plates and an included angle a2 between the lower node plates may have two design parameters to optimize vibration isolation, so as to minimize vibration transmission to the external parts. It may be found through the finite element simulation that the design of upper and lower sets of independent node plates may reduce the constraining force at the joint of flow tubes and a flow divider, thus may help to improve the vibration isolation. This is also different from the previous design.

The first pair of flow tubes and the second pair of flow tubes each have independent connecting circular arc segments c1 and c2. c1 and c2 are connecting areas outside the measurement area, the two circuit arc segments c1 and c2 are not connected together, and also do not need to be concentric, and the radius of the circular arc segments c1 and c2 may be larger or smaller, such that the flexibility of the design of the connecting area is increased, and the vibration isolation may be further improved.

Embodiment 2

Figure 3:
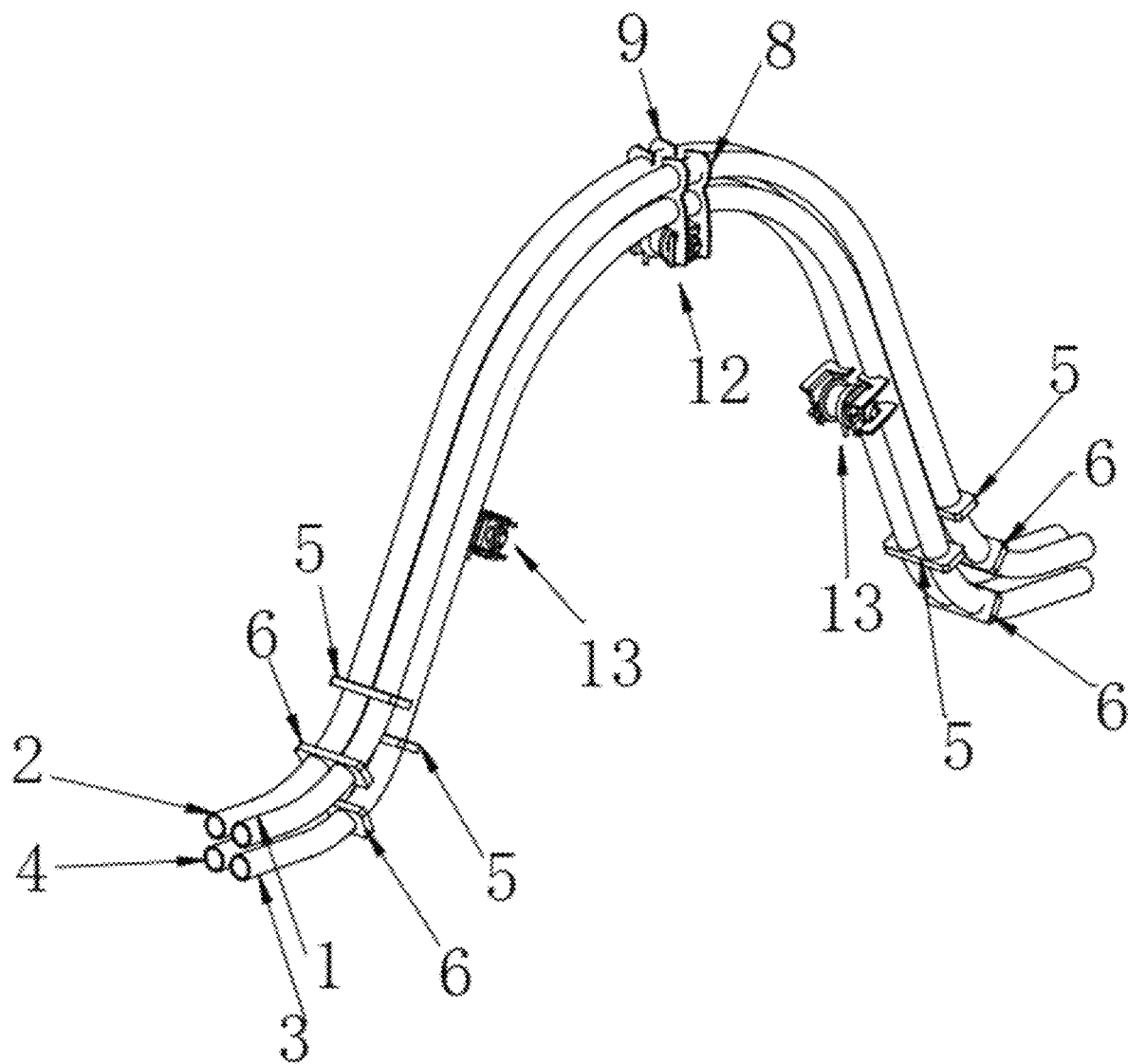
FIG. 3 shows a schematic diagram of a flow tube group according to Embodiment 2 of the present disclosure.
Figure 4:
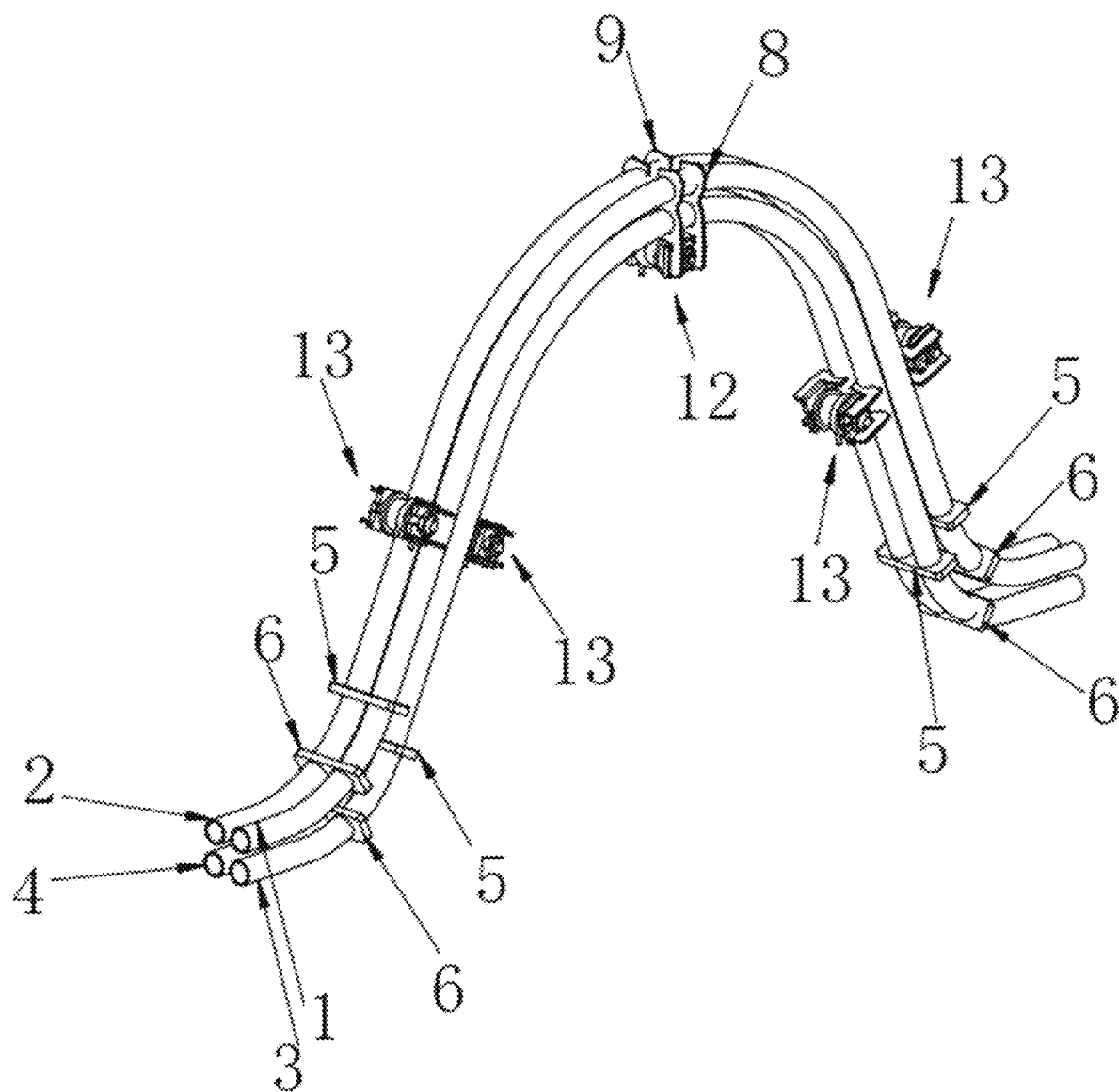
FIG. 4 shows another schematic diagram of Embodiment 2 of the present disclosure.

In Embodiment 1, the driver fixing plate and the detector fixing plate are used to connect the flow tubes in the same group. This embodiment may be an improvement on the basis of Embodiment 1, the coupling of the flow tubes in the same group may also be achieved by connecting the flow tubes in the same group only using the first driver fixing plate 8 and the second driver fixing plate 9, as shown in FIG. 3 and FIG. 4. The advantage may be that the structure of the detector may be relatively simple. As shown in FIG. 4, there may also be two additional detectors, so there are four detectors in total.

Embodiment 3

Figure 5:
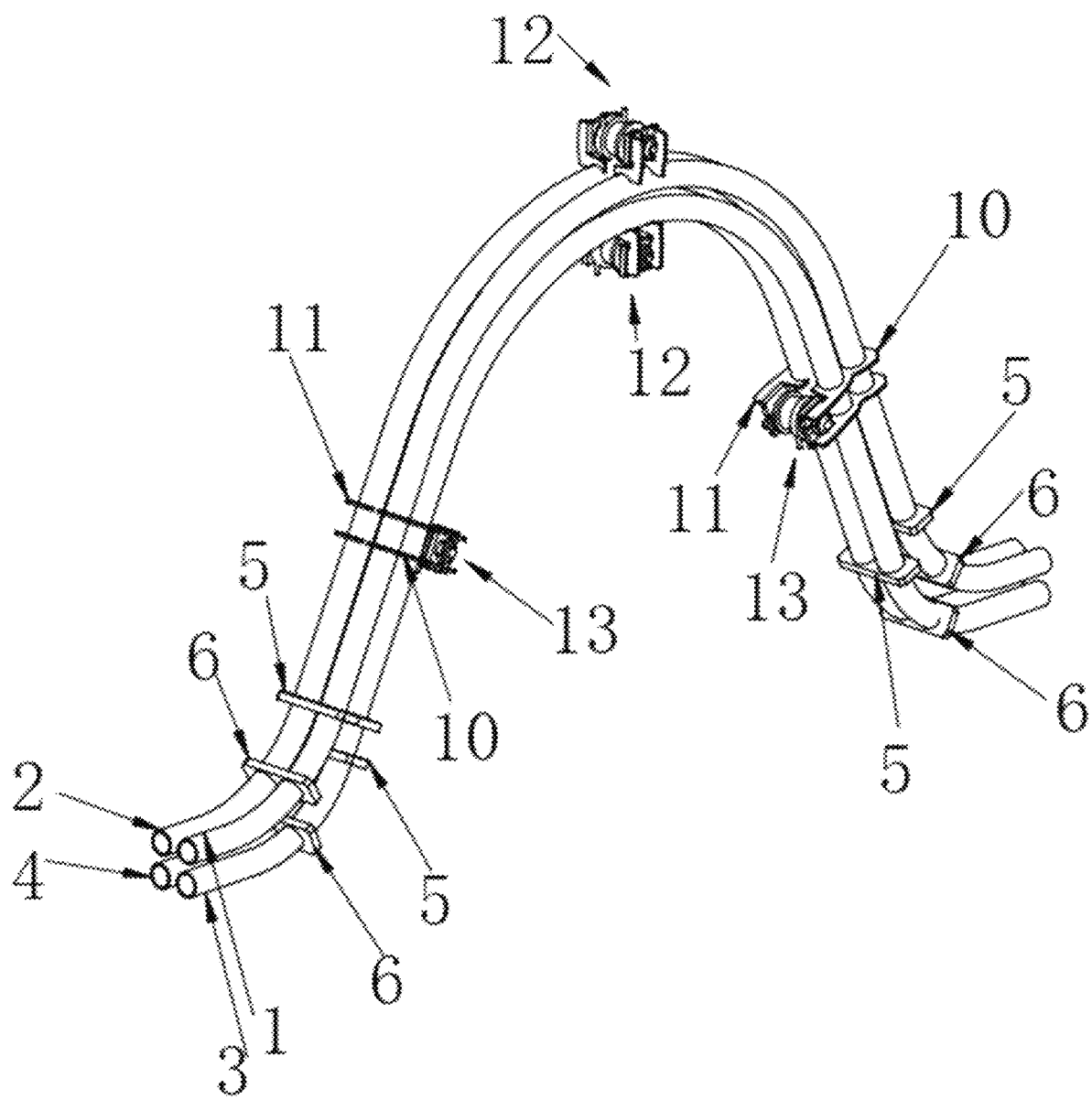
FIG. 5 shows a schematic diagram of a flow tube group according to Embodiment 3 of the present disclosure.

This embodiment may be an improvement on the basis of Embodiment 1, the coupling of the flow tubes in the same group may also be achieved by connecting the flow tubes in the same group only using the first detector fixing plate 10 and the second detector fixing plate 11, as shown in FIG. 5. The advantage of this scheme may be that the structure of the driver may be relatively simple, or there may be two relatively independent drivers arranged up and down.

Embodiment 4

Figure 6:
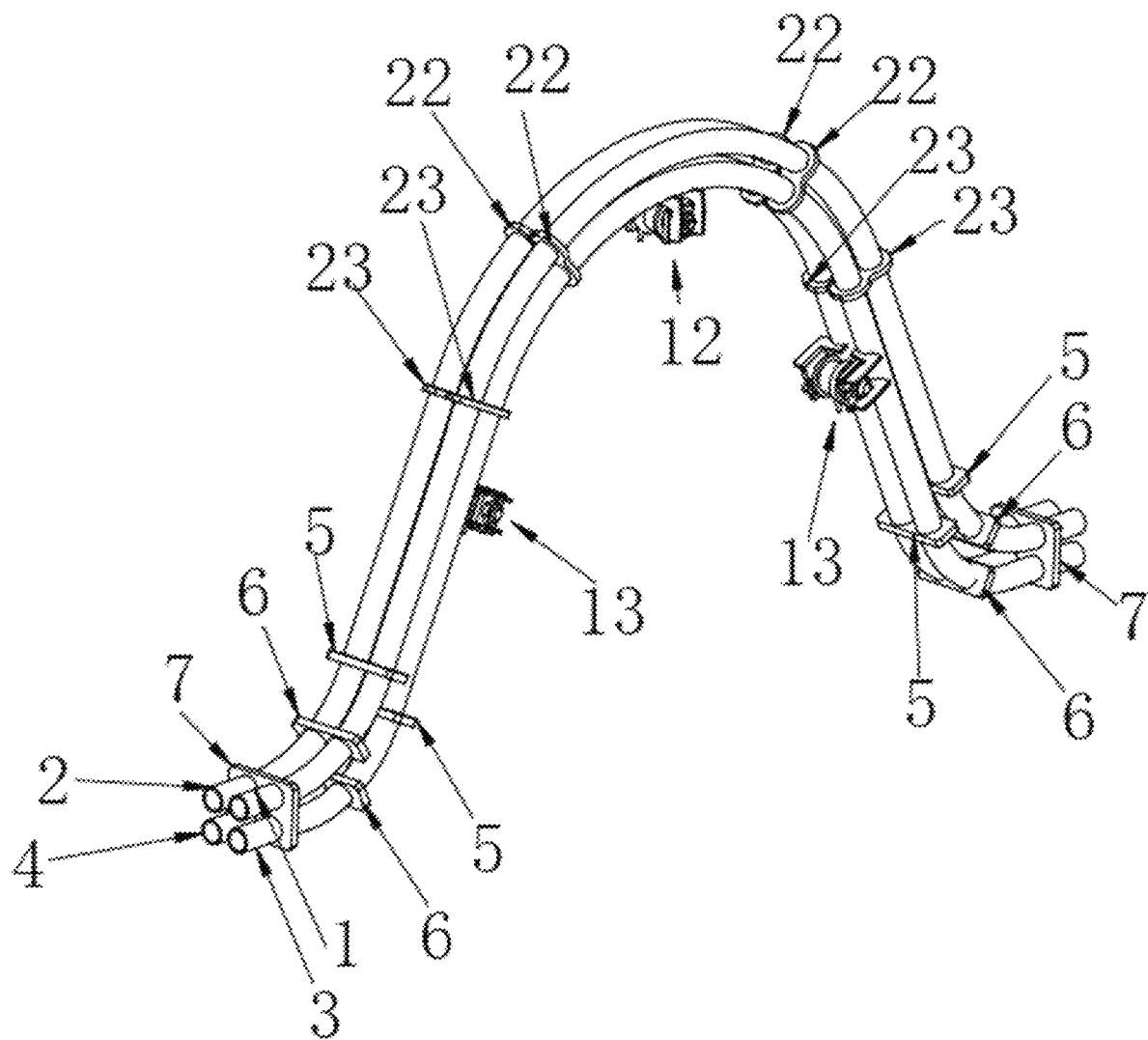
FIG. 6 shows a schematic diagram of a flow tube group according to Embodiment 4 of the present disclosure.

In addition to connecting the flow tubes in the same group using the fixing plate at the driving and detection positions in the above embodiments, the coupling of the flow tubes in the same group may also be achieved using a first fixing plate 22 and a second fixing plate 23 which are independent of each other, as shown in FIG. 6. The advantage of this scheme may be that the structures of the driver and the detector may both be relatively simple, and the coupling of the flow tubes in the same group may be achieved using an independent fixing plate. This scheme also illustrates that a pair of third node plates 7 is added at the outermost of the connecting area, which is more conducive to the vibration isolation for large-caliber sensors.

Embodiment 5

Figure 7:
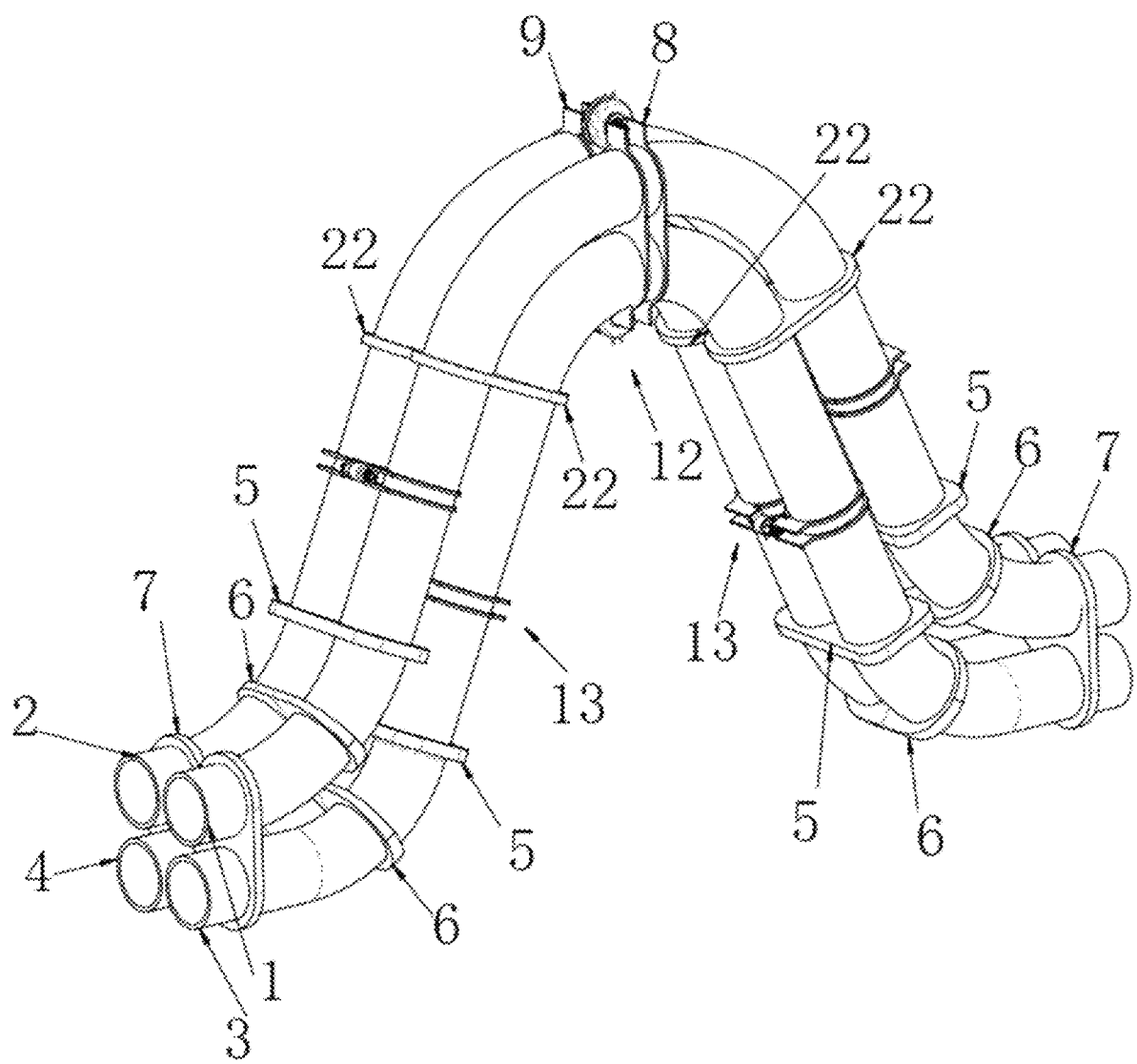
FIG. 7 shows a schematic diagram of a flow tube group according to Embodiment 5 of the present disclosure.

In addition to above schemes, the coupling of the flow tubes in the same group may also be achieved using the driver fixing plate or the detector fixing plate and an independent fixing plate, as shown in FIG. 7, the flow tubes in the same group are connected by the first driver fixing plate 8, the second driver fixing plate 9 and the independent first fixing plate 22. This scheme also illustrates that a pair of third node plates 7 is added at the outermost of the connecting area, and all flow tubes are connected together by the third node plates 7 at the outermost layer, which is more conducive to the vibration isolation for large-caliber sensors. The flow tube with small aspect ratio is illustrated in this scheme, in order to determine the stiffness of the measurement area, the optimal method is to calculate more accurately using the finite element method. By adjusting design parameters, the stiffness of the measurement areas of the flow tube pairs is the same or similar. An overall appearance structure provided by the scheme of this embodiment is as shown in FIG. 8 and FIG. 9.

Embodiment 6

Figure 10:
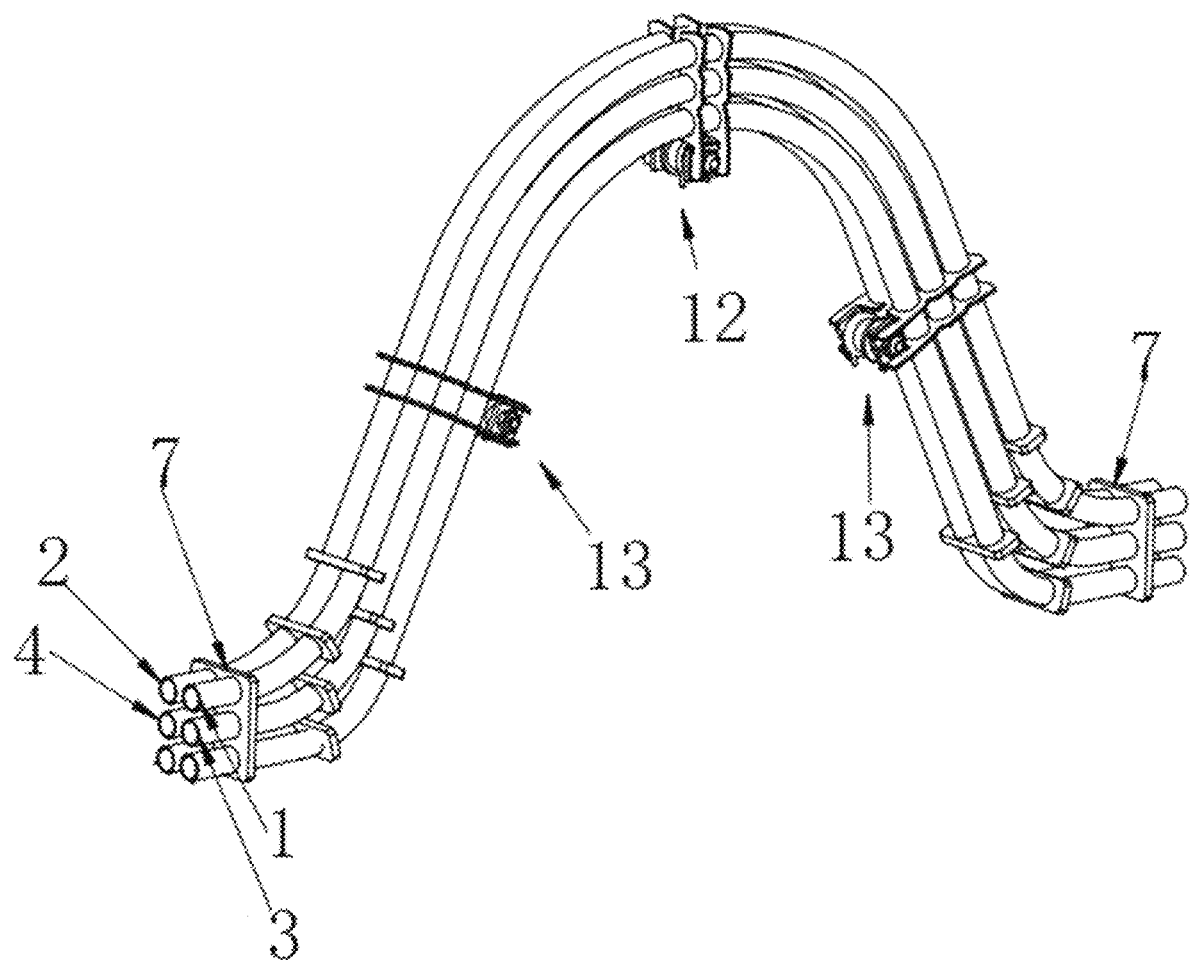
FIG. 10 shows a schematic diagram of a flow tube group in Embodiment 6 of the present disclosure.

The design principle of the present disclosure is also suitable for more bent tubes to form a Coriolis flowmeter, as shown in FIG. 10, each group may include three flow tubes, and the three flow tubes in the same group are connected together by the fixing plate. The advantage of this scheme may be that the measurement of larger flow may be achieved. This scheme also illustrates that a pair of third node plates 7 is added at the outermost of the connecting area, and all six flow tubes are connected together by the third node plates 7, which is more conducive to the vibration isolation for large-caliber sensors.

Figure 11:
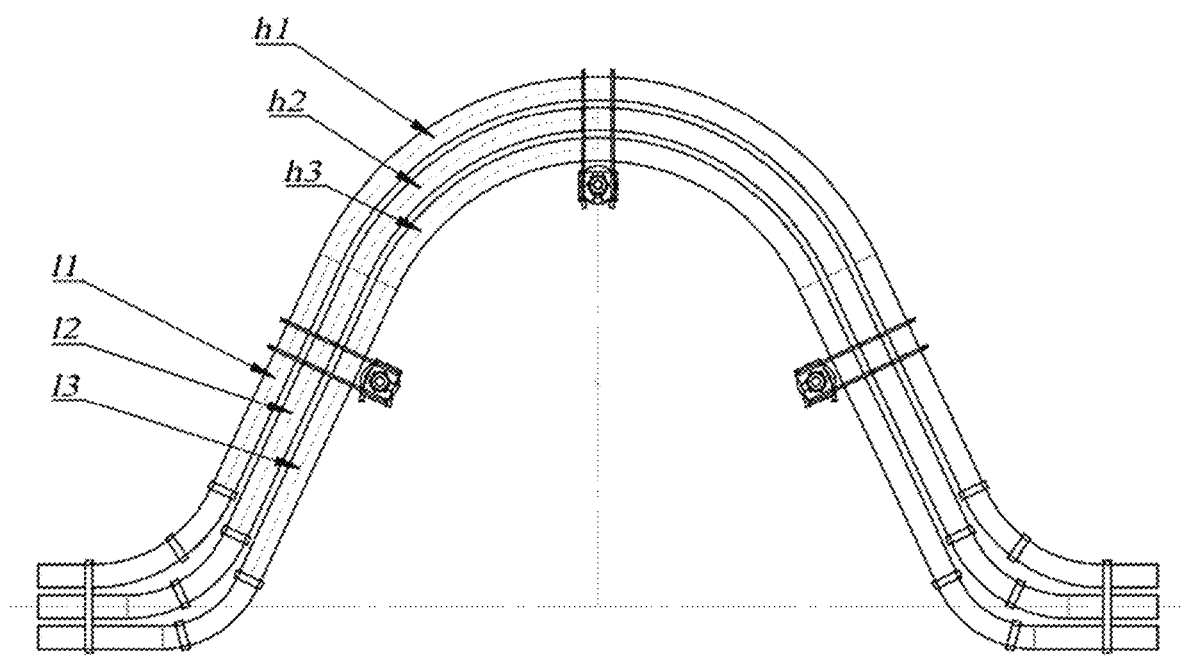
FIG. 11 shows a schematic diagram of the dimension of a flow tube group according to Embodiment 6 of the present disclosure.

FIG. 11 further illustrates an innovation point of the present disclosure, in which $11+h1=12+h2=13+h3.11+h1=12+h2=13+h3$ is the sum of the dimensions of the straight segments and circular arc segments of the three pairs of flow tubes, so that the stiffness of the measurement areas of the three pairs of flow tubes is approximately the same.

Embodiment 7

Figure 12:
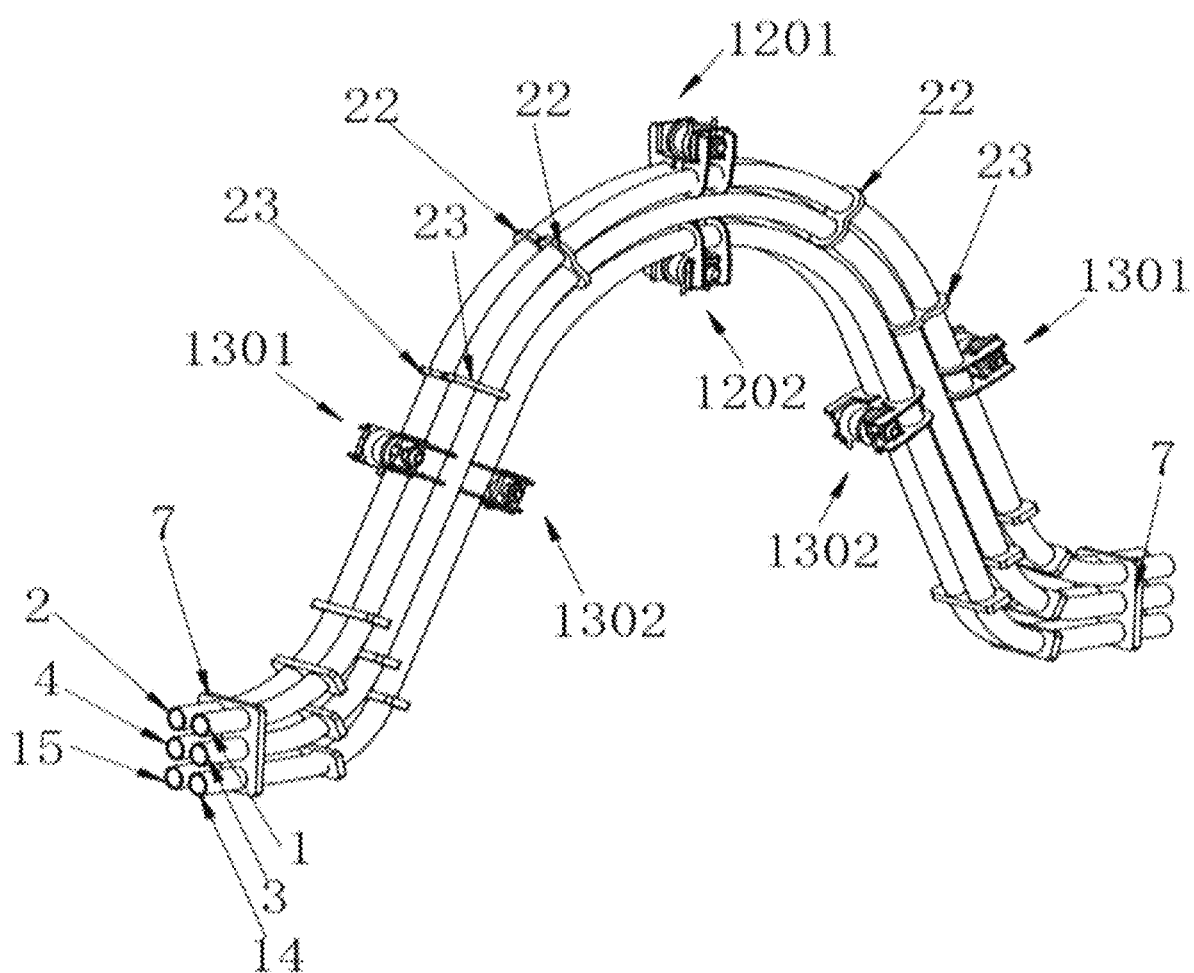
FIG. 12 shows a schematic diagram of a flow tube group according to Embodiment 7 of the present disclosure.

The Coriolis flowmeter including six flow tubes may also be divided into four flow tube groups, in addition to the first flow tube group and the second flow tube group, the third flow tube group and the fourth flow tube group are provided. As shown in FIG. 12, according to the principle of the present disclosure, the first group has at least a first flow tube and a third flow tube, the second group has at least a second flow tube and a fourth flow tube, the third group may have at least one fifth flow tube 14 and the fourth group may have at least one sixth flow tube 15.

The two flow tubes in the first group are connected together by an independent first fixing plate 22 and an independent second fixing plate 23 to form a group of flow tubes. The two flow tubes in the second group are connected together by the independent first fixing plate 22 and the independent second fixing plate 23 to form another group of flow tubes. The first group of flow tubes and the second group of flow tubes are vibrated at a first operating frequency generated by a first driver 1201, and the vibration is detected by two first detectors 1301.

Each of the third group and the fourth group has one flow tube, the vibration of the flow tubes is generated by a second driver 1202, and detected by a second detector 1302. The vibrations of the third group and the fourth group are at a second operating frequency, and the second operating frequency has a difference of at least 5 Hz from the first operating frequency. In this scheme, although only one flow tube is shown in each group, in the design principle, each group may include multiple flow tubes.

Embodiment 8

Figure 13:
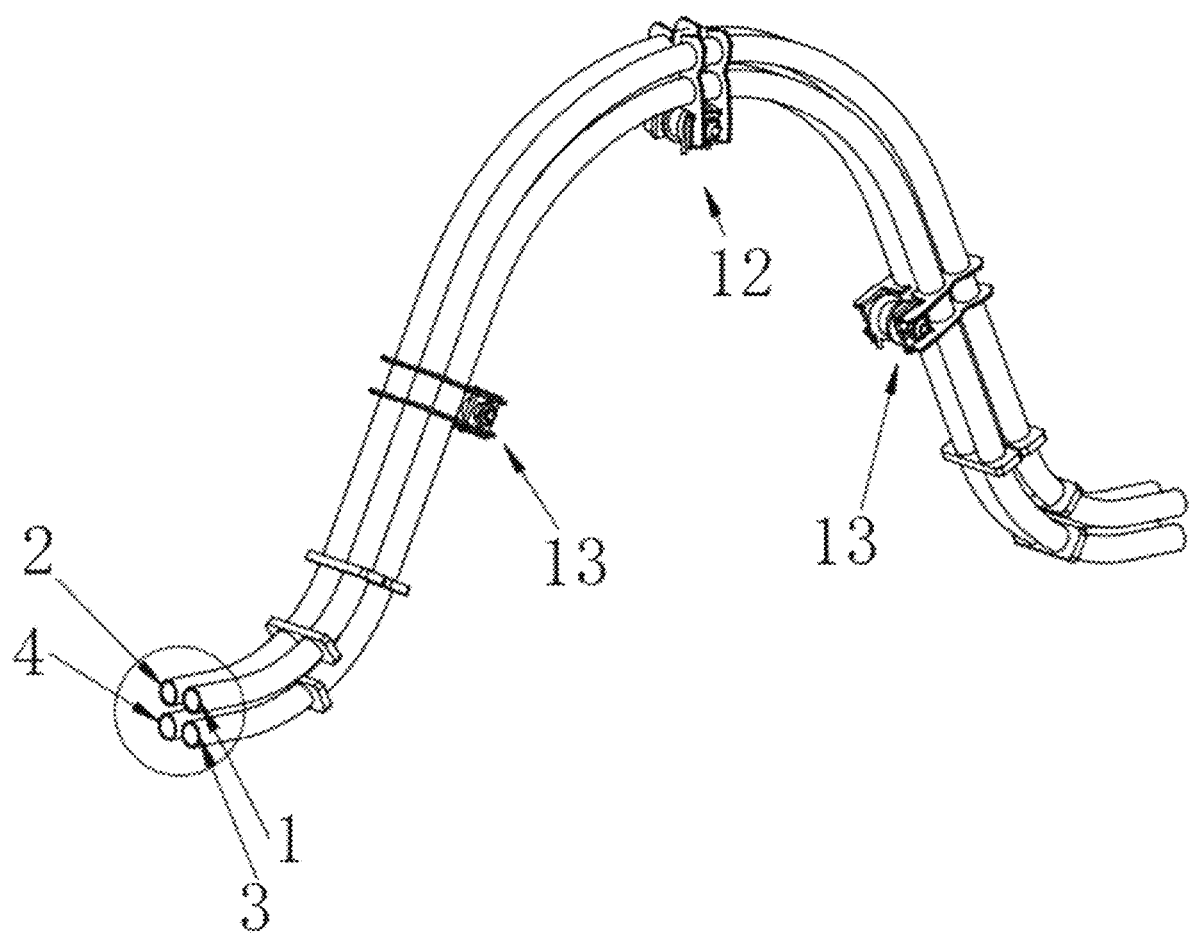
FIG. 13 shows a schematic diagram of a flow tube group according to Embodiment 8 of the present disclosure.
Figure 14:
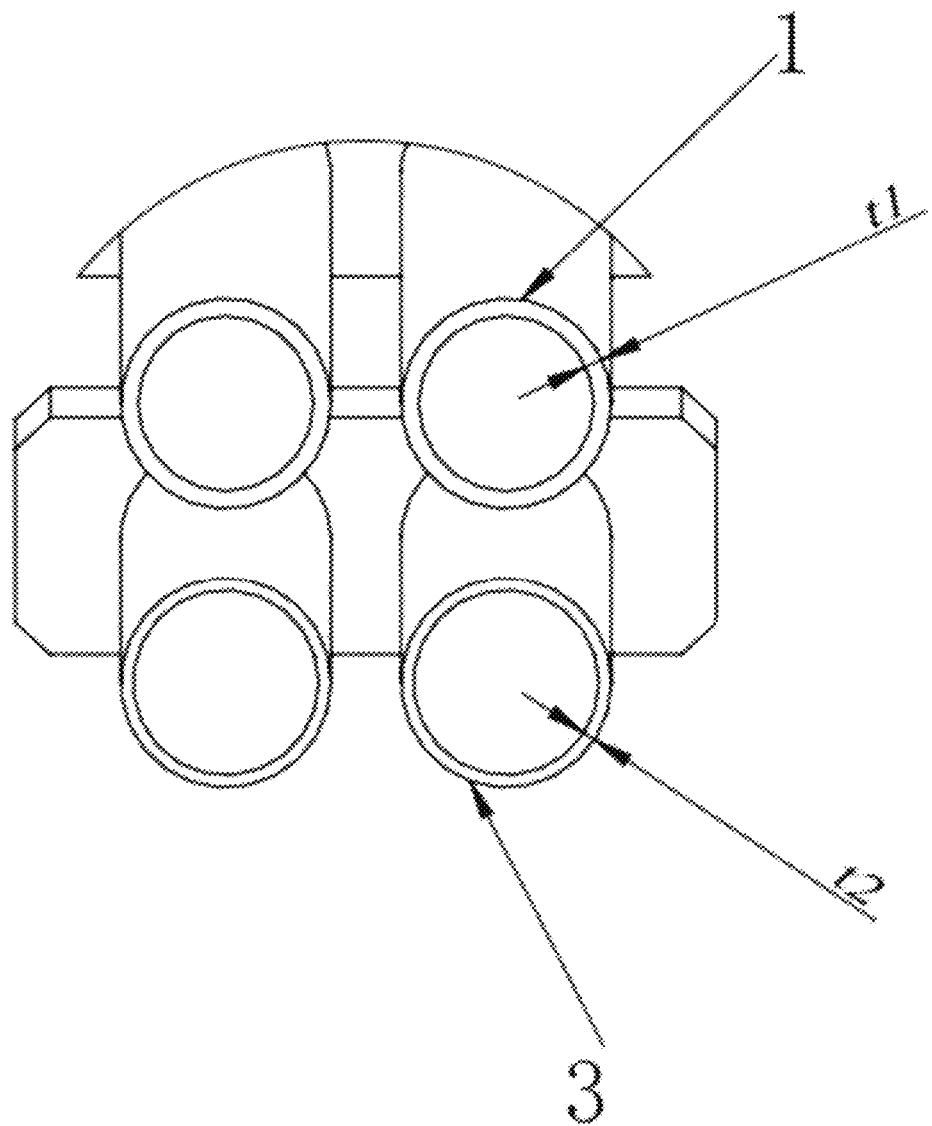
FIG. 14 shows a partial enlarged view of FIG. 13.

The above schemes all use flow tubes with the same outer diameter and thickness. In order to achieve approximate stiffness, the lengths of the measurement areas need to be approximately equal. In this embodiment, another design is given to illustrate the design principle of the present disclosure. As shown in FIG. 13, when the lengths of the measurement areas are unequal, the stiffness may be approximately equal through different thicknesses of the flow tubes. As shown in FIG. 14, the length of the measurement area of the first pair of flow tubes is greater than that of the measurement area of the second pair of flow tubes, if similar stiffness is to be achieved, the thickness t1 of the first pair of flow tubes needs to be greater than the thickness t2 of the second pair of flow tubes.

Embodiment 9

Figure 15:
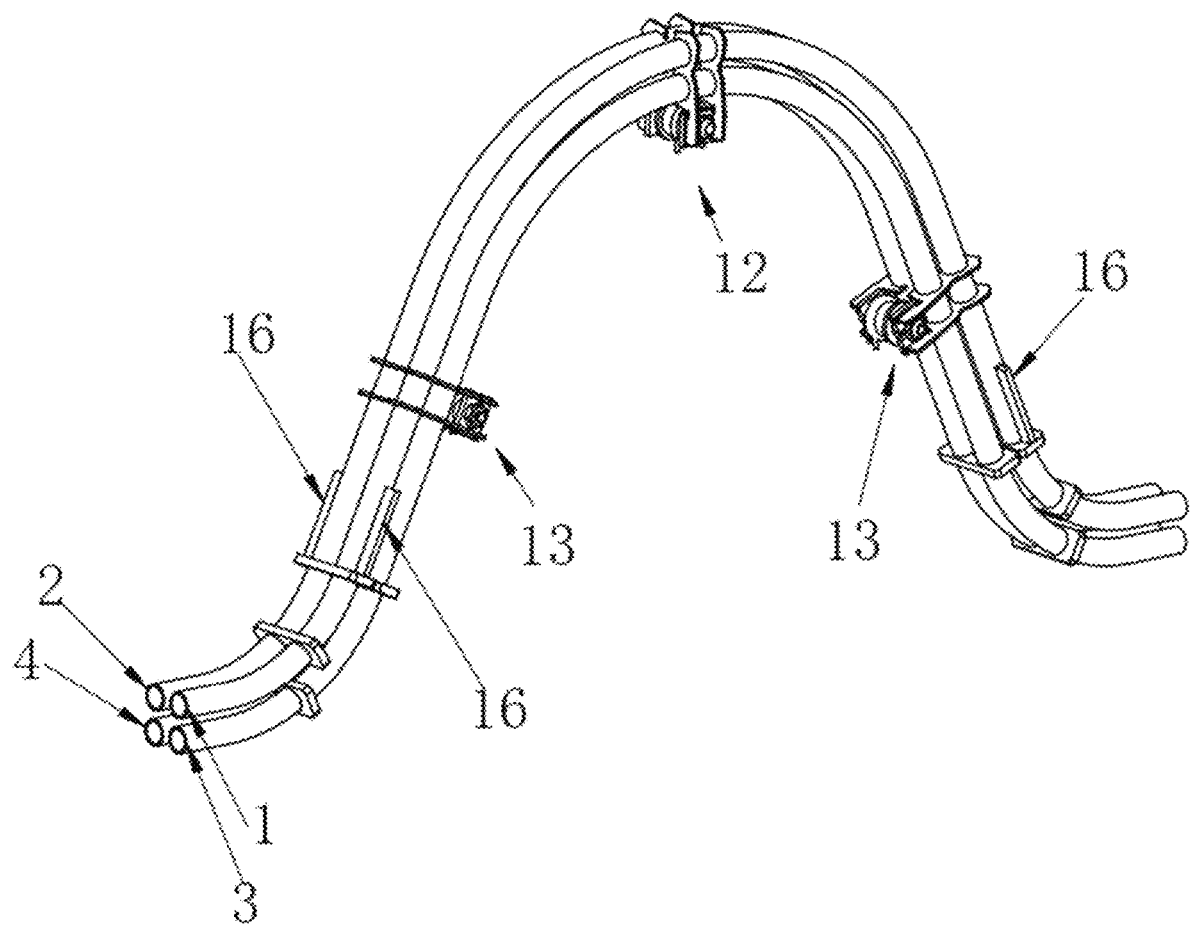
FIG. 15 shows a schematic diagram of a flow tube group according to Embodiment 9 of the present disclosure.

When the flow tubes have the same outer diameter and thickness but different measurement area lengths, the stiffness may be enhanced by a reinforcing plate 16, such that the stiffness of a pair of flow tubes is increased to make stiffness of the two pairs of flow tubes similar to each other. As shown in FIG. 15, if the stiffness of the measurement area of the first pair of flow tubes is relatively small, the stiffness of the measurement area of the first pair of flow tubes may be increased by adding the reinforcing plate 16 in the measurement area, and thus the stiffness of the upper pair of flow tubes is similar to that of the lower pair of flow tubes.

Embodiment 10

Figure 16:
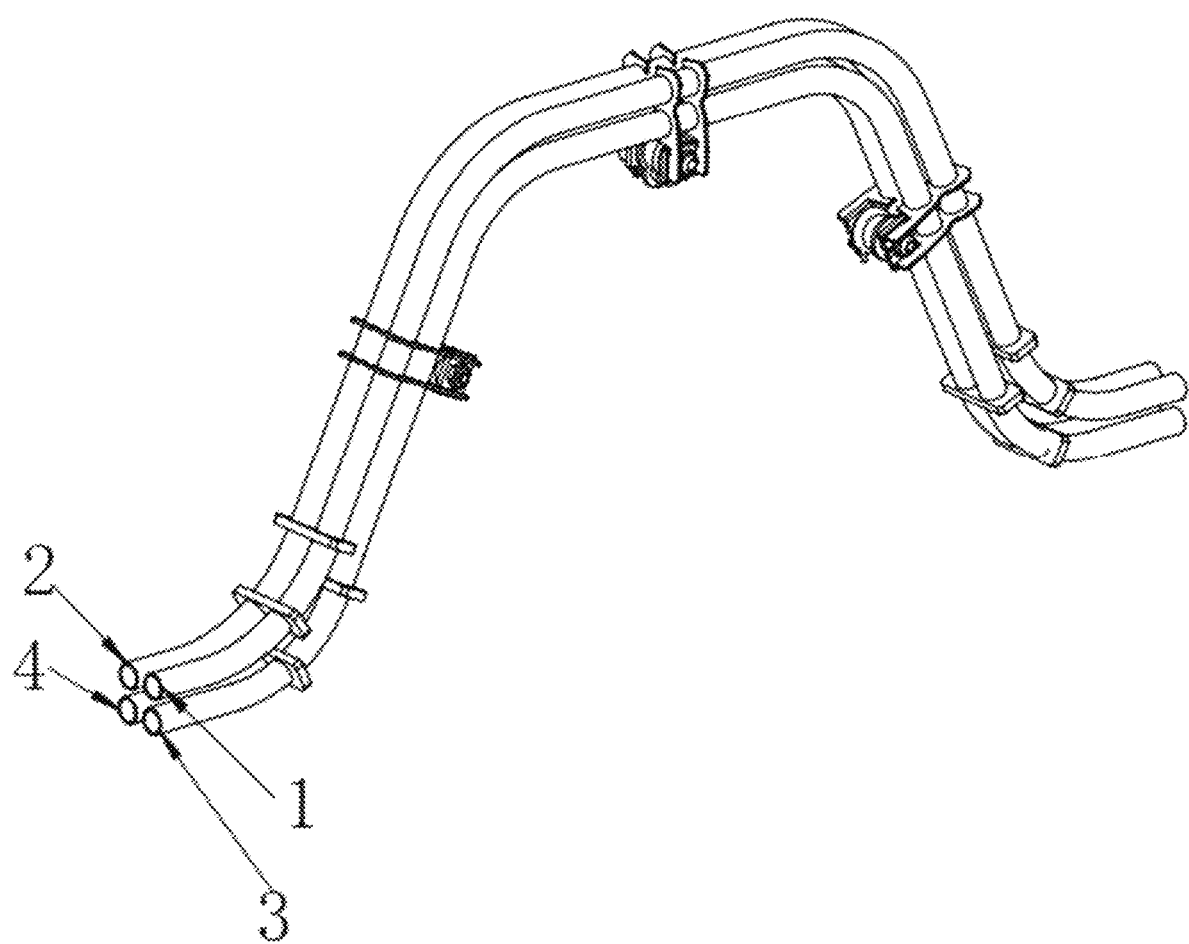
FIG. 16 shows a schematic diagram of a flow tube group according to Embodiment 10 of the present disclosure.
Figure 17:
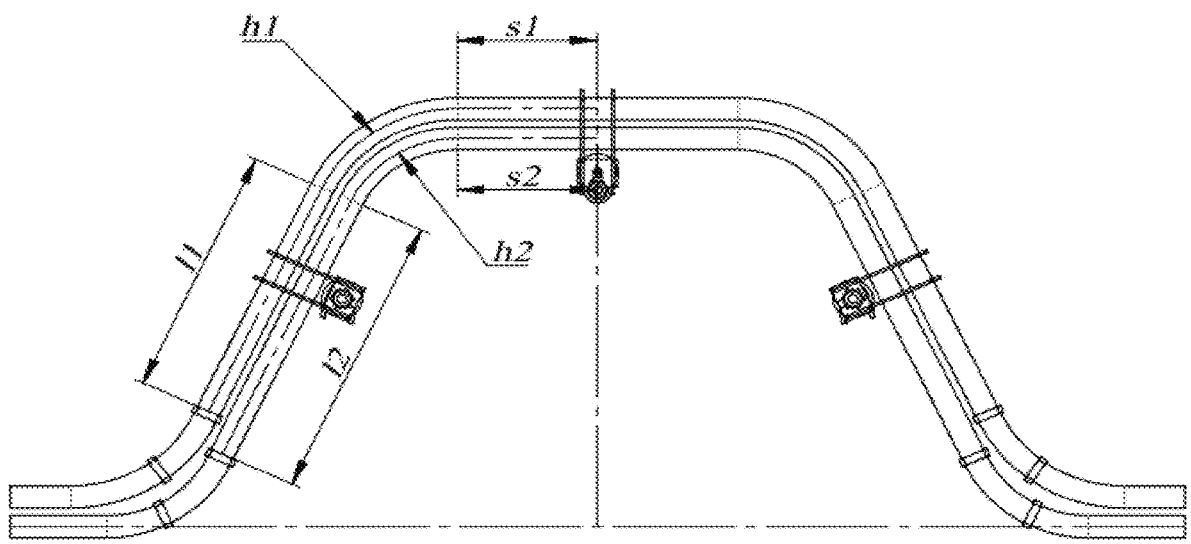
FIG. 17 shows a schematic diagram of the dimension of a flow tube group according to Embodiment 10 of the present disclosure.

The flow tube in the above scheme is similar to a V-shaped bent tube, but other bent tubes may also achieve the principle of the present design, such as trapezoid and U shape. FIG. 16 illustrates a trapezoidal bent tube. If the flow tubes have the same diameter and thickness, the dimension l1+h1+s1=l2+h2+s2 in FIG. 17 may ensure that the stiffness of the measurement areas is approximately equal. l1+h1+s1 is the sum of the dimensions of a straight segment, a circular arc segment and another straight segment of the first flow tube, l2+h2+s2 is the sum of the dimensions of a straight segment, a circular arc segment and another straight segment of the second flow tube.

Various embodiments of the disclosure may have one or more of the following effects. In some embodiments, the disclosure may provide a Coriolis flowmeter with multiple flow tubes, so as to solve the problems in the prior art. The flowmeter may achieve the optimal coupling of the flow tubes in the same group, and is beneficial to the vibration isolation from the external parts. In other embodiments, the disclosure may provide a Coriolis flowmeter with multiple flow tubes, which may help to solve the problems in the prior art. The flowmeter may achieve the optimal coupling of the flow tubes in the same group, and may be beneficial to the vibration isolation from the external parts. In further embodiments, by adopting the driver fixing plate, the detector fixing plate, or independent fixing plates at other positions, at least two flow tubes may be relatively rigidly connected together to form a flow tube group. A structure with two flow tube groups that may vibrate in opposite directions to achieve self-balance may be formed by using another flow tube group with the same structure, together with the node plates used to define the measurement area, and the flow and density may be measured using Coriolis principle. In order to achieve the optimal coupling of each group of flow tubes, the measurement areas of all flow tubes in the flow tube groups may be designed to have the same or similar stiffness. In order to achieve the optimal vibration isolation, at least the node plates at the inner side only connect a pair of flow tubes, but not all flow tubes. Through the present disclosure, the coupling between the flow tubes in the same group may be improved, and the vibration isolation of multiple measurement areas from the external parts may be improved.

In the description of the present disclosure, it needs to be understood that the orientation or positional relationship indicated by terms "center", "top", "bottom", "left", "right", "vertical", "horizontal", "inside" and "outside" is based on the orientation or positional relationship shown in the drawings only for convenience of description of the present disclosure and simplification of description rather than indicating or implying that the device or element referred to must have a particular orientation, and be constructed and operated in a particular orientation, and thus are not to be construed as limiting the present disclosure. Furthermore, the terms "first" and "second" are used for descriptive purposes only and are not to be construed as indicating or implying relative importance.

While the disclosure has been particularly shown and described with reference to the accompanying drawings and examples, it is to be understood that the disclosure is not limited in any manner by the foregoing description. It will be apparent to those skilled in the art that various modifications and variations may be made to the disclosure without departing from the spirit or scope of the disclosure.

Many different arrangements of the various components depicted, as well as components not shown, are possible without departing from the spirit and scope of the disclosure. Embodiments of the disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

What is claimed is:

1. A Coriolis flowmeter with multiple flow tubes, comprising a flow sensor and a flow transmitter, wherein:
the flow sensor comprises a sensor housing, a sleeve, and two symmetrical flanges;
a sensor assembly is arranged in the sensor housing, the sensor assembly comprises at least two flow tube groups, and each flow tube group of the at least two flow tube groups comprises at least two flow tubes;
at least two flow tube pairs are provided by the at least two flow tube groups, each flow tube pair of the at least two flow tube pairs is formed by two flow tubes with same size and geometry in different flow tube groups of the at least two flow tube groups, each flow tube pair is fixedly connected together by at least one pair of node plates, a measurement area of the flow tubes is between an innermost pair of the at least one pair of node plates, and each flow tube group is connected to a driver and a detector;

the at least two flow tube groups comprise a first flow tube group, a second flow tube group, a third flow tube group, and a fourth flow tube group;

each of the first flow tube group and the second flow tube group comprises at least two flow tubes, and each of the third flow tube group and the fourth flow tube group comprises at least one flow tube;

all flow tubes in the first flow tube group are connected by a first detector fixing plate, and all flow tubes in the second flow tube group are connected by a second detector fixing plate;

a first detector is fixedly arranged between the first detector fixing plate and the second detector fixing plate;

a first driver is connected to the flow tubes in the first flow tube group and the second flow tube group;

a second driver and a second detector are connected to the flow tubes in the third flow tube group and the fourth flow tube group; and the first driver and the second driver are different in operating frequency.

2. The Coriolis flowmeter with multiple flow tubes according to claim 1, wherein:

the node plates comprise first node plates and second node plates;

the measurement area of the flow tubes is arranged between two first node plates, two second node plates are separately provided at outer sides of the two first node plates, and the second node plates are located in a connecting area of the flow tubes; and each flow tube pair is individually connected together by a pair of the first node plates and a pair of the second node plates.

3. The Coriolis flowmeter with multiple flow tubes according to claim 2, wherein:

the node plates comprise first node plates, second node plates and third node plates;

the measurement area of the flow tubes is arranged between two first node plates, two second node plates are separately provided at outer sides of the two first node plates, and the two second node plates are located at a connecting area of the flow tubes;

each flow tube pair is individually connected by a pair of the first node plates and a pair of the second node plates; and two third node plates are symmetrically provided at outer sides of the two second node plates, and the two third node plates are used to connect two or more of the flow tube pairs together.

4. The Coriolis flowmeter with multiple flow tubes according to claim 1, wherein each of the flow tubes is of a symmetric V-shaped or trapezoid structure.

5. A Coriolis flowmeter with multiple flow tubes, comprising a flow sensor and a flow transmitter, wherein:

the flow sensor comprises a sensor housing, a sleeve, and two symmetrical flanges;

a sensor assembly is arranged in the sensor housing, the sensor assembly comprises at least two flow tube groups, and each flow tube group of the at least two flow tube groups comprises at least two flow tubes;

at least two flow tube pairs are provided by the at least two flow tube groups, each flow tube pair of the at least two flow tube pairs is formed by two flow tubes with same size and geometry in different flow tube groups of the at least two flow tube groups, each flow tube pair is fixedly connected together by at least one pair of node plates, a measurement area of the flow tubes is between an innermost pair of the at least one pair of node plates, and each flow tube group is connected to a driver and a detector, the at least two flow tube groups comprise a first flow tube group, a second flow tube group, a third flow tube group, and a fourth flow tube group;

each of the first flow tube group and the second flow tube group comprises at least two flow tubes, and each of the third flow tube group and the fourth flow tube group comprises at least one flow tube;

all flow tubes in the first flow tube group are connected by a first driver fixing plate, and all flow tubes in the second flow tube group are connected by a second driver fixing plate;

a first driver is fixedly arranged between the first driver fixing plate and the second driver fixing plate;

a first detector is connected to the flow tubes in the first flow tube group and the second flow tube group;

a second driver and a second detector are connected to the flow tubes in the third flow tube group and the fourth flow tube group; and the first driver and the second driver are different in operating frequency.

6. The Coriolis flowmeter with multiple flow tubes according to claim 5, wherein:

the node plates comprise first node plates and second node plates;

the measurement area of the flow tubes is arranged between two first node plates, two second node plates are separately provided at outer sides of the two first node plates, and the second node plates are located in a connecting area of the flow tubes; and each flow tube pair is individually connected together by a pair of the first node plates and a pair of the second node plates.

7. The Coriolis flowmeter with multiple flow tubes according to claim 6, wherein:

the node plates comprise first node plates, second node plates and third node plates;

the measurement area of the flow tubes is arranged between two first node plates, two second node plates are separately provided at outer sides of the two first node plates, and the two second node plates are located at a connecting area of the flow tubes;

each flow tube pair is individually connected by a pair of the first node plates and a pair of the second node plates; and two third node plates are symmetrically provided at outer sides of the two second node plates, and the two third node plates are used to connect two or more of the flow tube pairs together.

8. The Coriolis flowmeter with multiple flow tubes according to claim 5, wherein each of the flow tubes is of a symmetric V-shaped or trapezoid structure.

9. A Coriolis flowmeter with multiple flow tubes, comprising a flow sensor and a flow transmitter, wherein:

the flow sensor comprises a sensor housing, a sleeve, and two symmetrical flanges;

a sensor assembly is arranged in the sensor housing, the sensor assembly comprises at least two flow tube groups, and each flow tube group of the at least two flow tube groups comprises at least two flow tubes;

at least two flow tube pairs are provided by the at least two flow tube groups, each flow tube pair of the at least two flow tube pairs is formed by two flow tubes with same size and geometry in different flow tube groups of the at least two flow tube groups, each flow tube pair is fixedly connected together by at least one pair of node plates, a measurement area of the flow tubes is between an innermost pair of the at least one pair of node plates, and each flow tube group is connected to a driver and a detector, the at least two flow tube groups comprise a first flow tube group, a second flow tube group, a third flow tube group, and a fourth flow tube group;

each of the first flow tube group and the second flow tube group comprises at least two flow tubes, and each of the third flow tube group and the fourth flow tube group comprises at least one flow tube;

all flow tubes in the first flow tube group and the second flow tube group are fixedly connected by at least one pair of fixing plates, and each pair of fixing plates comprises two fixing plates which have a same structure and are symmetrically arranged along a middle plane between a flowmeter inlet and a flowmeter outlet;

a first detector and a first driver are connected to the flow tubes in the first flow tube group and the second flow tube group;

a second driver and a second detector are connected to the flow tubes in the third flow tube group and the fourth flow tube group; and the first driver and the second driver are different in operating frequency.

10. The Coriolis flowmeter with multiple flow tubes according to claim 9, wherein:

the node plates comprise first node plates and second node plates;

the measurement area of the flow tubes is arranged between two first node plates, two second node plates are separately provided at outer sides of the two first node plates, and the second node plates are located in a connecting area of the flow tubes; and each flow tube pair is individually connected together by a pair of the first node plates and a pair of the second node plates.

11. The Coriolis flowmeter with multiple flow tubes according to claim 10, wherein:

the node plates comprise first node plates, second node plates and third node plates;

the measurement area of the flow tubes is arranged between two first node plates, two second node plates are separately provided at outer sides of the two first node plates, and the two second node plates are located at a connecting area of the flow tubes;

each flow tube pair is individually connected by a pair of the first node plates and a pair of the second node plates; and two third node plates are symmetrically provided at outer sides of the two second node plates, and the two third node plates are used to connect two or more of the flow tube pairs together.

12. The Coriolis flowmeter with multiple flow tubes according to claim 9, wherein each of the flow tubes is of a symmetric V-shaped or trapezoid structure.

* * * * *